United States Patent [19]

Stupec

[11] 4,119,742

[45] Oct. 10, 1978

[54] RECONSTITUTED FRIED PUFFED PORK SKINS

[75] Inventor: Gertraud B. Stupec, Hinsdale, Ill.

[73] Assignee: Beatrice Foods Co., Chicago, Ill.

[21] Appl. No.: 734,967

[22] Filed: Oct. 22, 1976

[51] Int. Cl.$^2$ ................................................ A23L 1/31
[52] U.S. Cl. ................................... 426/641; 426/104; 426/440; 426/456; 426/516
[58] Field of Search ............... 426/104, 576, 641, 440, 426/448, 456, 516, 517, 289, 417, 441, 438, 392

[56] References Cited

U.S. PATENT DOCUMENTS

| | | | |
|---|---|---|---|
| 2,547,747 | 4/1951 | Darrow | 426/289 |
| 2,907,660 | 10/1959 | O'Brian et al. | 426/438 |
| 2,947,635 | 8/1960 | Paynter et al. | 426/441 |
| 3,401,045 | 9/1968 | Halpern | 426/641 X |

*Primary Examiner*—Robert A. Yoncoskie
*Attorney, Agent, or Firm*—Murray & Whisenhunt

[57] ABSTRACT

A reconstituted fried and puffed product is prepared by moisturizing particles of animal parts which are high in collagen and at least 50% of which are rendered parts, gelatinizing the particles in an extruder, extruding a strip of the gelatinized material, cutting the strip to pellets, drying and deep-fat frying the pellets. The particles must have moisture contents between 18% and 35%. The extrudate must be cooled prior to expelling from the die. The pellets must have a dimension of ¼ inch or less to insure proper puffing. The starting material may come from any high collagen, animal or fowl part.

14 Claims, No Drawings

RECONSTITUTED FRIED PUFFED PORK SKINS

The present invention relates to a reconstituted fried and puffed product which closely simulates fried and puffed pork skins and to methods of production thereof. In particular, the invention relates to such products and processes wherein the starting material may or may not contain pork skins or where pork skin constitutes only a minor part of the starting material.

BACKGROUND OF THE INVENTION

Puffed pork skins have been a popular snack food for many years. This snack food has its genesis from "cracklings" which was a solid product resulting from conventionally-practiced rendering processes. Hog fat or lard is rendered by applying heat to melt the fat and to drive water out of the tissue. After the melted fat is drained away, the remaining solid portions of the tissue are compressed, while hot, to squeeze out additional fat. This solid, compressed product of non-fat tissue is called "cracklings" because of the brittle nature of that product. With time, the more-usually practiced technology for producing lard changed and the avalability of "cracklings" decreased, while the demand for "cracklings" increased.

A snack food which is similar to "cracklings" is prepared by cutting pork skins into strips, rendering and deep-fat frying those strips at high temperatures until the strips are puffed. While this process is the conventionally practiced process, it does have problems associated therewith which have long plagued the art. The availability of pork skins changes from time to time, as well as the quality thereof, and the conventional process can not acceptably accomodate significant variations in the starting material, since unacceptable product, e.g. a tough product, may result. The process produces substantially quantities of small rendered pieces (called fines, balls and tails — depending on the size and shape) which cannot be puffed into an acceptable product and is therefore wasteful of starting material. The process is somewhat time-consuming and, hence, substantially increases the cost of the product.

The art has long sought processes to obviate one or more of these problems. For example, U.S. Pat. No. 2,547,747 proposes to use bacon rinds instead of skins and the rinds are steam-cooked, ground, and extruded into strips which are subsequently cut in appropriate sizes and deep-fat fried or baked to puff the strips. Somewhat similarly, U.S. Pat. No. 2,562,850 suggests that a high pressure steam cooking be carried out until the bacon rind is gelatinized, and, after pressing to remove the remaining fat, the gelatinized mass is formed into sheets, cut, and then deep-fat fried or baked.

In U.S. Pat. No. 2,947,635, the toughness often associated with some puffed pork skins is attributed to inadequate moisture removal in the frying step which result from the collapse of puffed cells in the fried skin. To avoid this difficulty, it is proposed that the frying take place by means of differential pressure processing, e.g., the frying step being carried out in deep fat maintained in a vacuum system.

On the other hand, U.S. Pat. No. 2,907,660 teaches that the difficulty is due to varying moisture contents of the pork skins (including bacon rinds and green skins), even after an initial rendering step. This also results in variable properties of the fried skins. That patent suggests heating the skins in hot oil until all visible vapor is removed and then further heating the skins in that oil under pressurized conditions of up to 20 psi. That intermediate product is then said to be uniform in moisture content and will produce uniform puffed skins.

A somewhat similar process is described in U.S. Pat. No. 3,401,045, where green pork skins are cut and rendered in fat at higher temperatures for extended periods of time, i.e., until the green skins are cooked and are reduced in size to about one-half of the original size. These relatively hard, dry and tough pieces are then soaked in an aqueous flavoring solution, dried to the proper moisture content and puffed by deep-fat frying.

A similar idea is stated in U.S. Pat. No. 3,428,462, which proposes low-rendering temperatures for initially cooking green pork skins, with increasing fat temperatures and the repeated addition of water to the fat vessel until the green skins are finally cooked and puffed at the higher temperatures of the latter portions of the process. This is said to supply the necessary moisture for the skins and avoid the difficulty of hard and impalatable product.

As can be easily appreciated from the foregoing, the art has long struggled with the difficulties in the conventional process and many different ideas about alternative starting materials and the causes of the difficulties and the means of obviating those difficulties have been proposed. One common factor that stands out, however, is the difficulty of obtaining uniform starting materials. The conventional process is not well adapted to handle a variety of starting materials and these various different starting materials have necessitated a number of different and mutually distinct processes. Of course, however, changing a manufacturing process each time the starting material changes is not practical. Thus, from a practical point of view only the use of pork skins as the starting material has achieved any substantial commercial success, even though this conventional process continues to have the problems discussed above.

This problem has recently been accentuated by the popularity of pigkin leathers for shoes, garment decorations, and the like, which has severely limited the amount of green pork skins available for processing into the snack food. Further, the increased popularity of bacon having the rind thereon has decreased the availability of bacon rinds for the less desirable but alternative process. As a result, efforts have been made to utilize animal parts, other than pork skins, for producing the snack food, but these efforts, of course, introduce even more variability of starting material than the variability of the pork skins which has long plagued the art, as discussed above. However, in view of the shortage of all of green pork skins, bacon rinds, and rendered skins, it would be a decided advantage to the art to provide processes for handling variable starting materials for the snack food. It would be a further advantage to the art when the processes may be operated with minimum of adjustments for various starting materials.

OBJECTS OF THE INVENTION

It is, therefore, an object of the invention to provide processes which can produce a reconstituted fried and puffed product which closely resembles the natural fried and puffed pork skins but which do not necessarily require pork skins as the starting material and which can use a wide variety of animal parts. It is a further object of the invention to provide processes wherein the variables of the starting materials require only a a minimum of adjustment in the process conditions. It is another object of the invention to provide such products from the waste products of the conventional rendering process, i.e., the fines, balls and tails. Other objects will be apparent from the following disclosure an claims.

BRIEF DESCRIPTION OF THE INVENTION

The present invention is based on several primary discoveries. A first and important discovery is that the present product can be prepared from almost any animal part starting material which contains a substantial amount of collagen. The finished product is almost indistinguishable from fried and puffed natural pork skins and when the product contains substantial amounts of fines, balls and tails recovered from the rendering of pork skins, it is essentially a reconstituted fried pork skin. Thus, for simplicity, the specification and claims will hereafter refer to the present product as "reconstituted pork skins." Further, in the specification and claims, the term "pork skins" is defined to include not only the conventional green pork skin, but rendered pork skin and bacon or ham rinds, unless otherwise specifically noted. This discovery allows a wide choice of starting materials, but this latitude also engenders wide variability of properties of the starting material.

A second important discovery is that the particular starting material (having the substantial collagen content) will not substantially disrupt the present processes, so long as at least the majority of the starting material has been rendered and the moisture content is controlled during certain of the present processing steps.

The third important discovery is that the moisture content of the starting material, necessary for an earlier processing step, is greater than the moisture content which is acceptable for the subsequent frying step and a drying step must be carried out prior to the final frying step.

A subsidiary feature of the invention resides in the particular methods of handling and shaping the starting material, and, in particular, an extruding step.

Briefly stated, the method of the invention produces reconstituted fried and puffed pork skins from particles of animal parts where the total combination of particles is high in collagen and at least 50% of the particles have been rendered. The particles are moisturized (with water) to moisture contents between 18 and 35% by weight. The moisturized particle are fed to the throat of a die-ended screw-type extruder having thermally-controllable barrel sections along the screw. The barrel section next to the throat is maintained at temperatures of at least less than 85° F., especially less than 80° F., while the barrel section(s) between the throat section and the section next to the die is maintained at temperatures between 215° to 310° F. At least one of the barrel sections next to the die and/or the die is maintained at temperatures such that the extrudate exiting the die is at temperatures no greater than 220° F. The rotation of the extruder screw and the feed rate of the moisturized particles are controlled so that, by virtue of sufficient heat and pressure being generated on the particles, the extrudate which exits the die is smooth, glossy, and does not exhibit reversion characteristics at room temperature (retains the glossy and smooth appearance and will not revert to a particulate form). The extrudate is cooled sufficiently to allow cutting of the extrudate, e.g., generally to temperatures less than 160° F., preferably to 140° F. or less. The extrudate is then cut into pellets so that at least one dimension thereof is no greater than ⅛ inch, and the other dimensions are consistent with the dimensions of conventional fried pork skins, e.g., up to 4 inches long and 2 inches wide. This cutting also provides dimensions acceptable for accomplishing proper puffing in a subsequent deep-fat frying step.

The pellets are dried to moisture contents of at least less than 15% by weight and deep-fat fried at temperatures between 350° F. and 420° F. until the moisture content thereof is at least less than 3.5% by weight and the pellets have puffed to at least twice the unpuffed volume.

A majority of the animal parts, i.e. more than 50% by weight will be rendered parts, i.e. rendered by any of the conventional rendering techniques. Conventional techniques include heat-rendering (either by hot air, smoke or oil) but usually the technique will include at least in part a hot oil rendering. The term "rendered" is used herein in the same sense of the conventional process where essentially all of the moistures and fat is removed from the skins which can be removed at rendering temperatures between 212° F. and 350° F. and for at least ½ hour, e.g. at least one hour.

The animal parts should be comminuted, if in large size, prior to extrusion since otherwise the particles will be too large for effective action by the extruder, and it is preferred that the particles have an average dimension of no greater than ½ inch and preferably no dimension greater than ¼ to ⅛ inch prior to extrusion.

While the moisturizing step may be carried out at any desired temperature, it is preferred that it be carried out at elevated temperatures, e.g., up to 200° F., to hasten the moisturization. For example, the moisturizing may be conducted simply by adding hot water, e.g., up to 212° F. to the animal parts. Alternately steam or steam and water may be added.

After this drying step, it is usually necessary that the dried pellets are equilibrated, i.e., remain at rest for a time period until the moisture distribution is essentially uniform throughout the pellets. This will allow more uniform puffing of the pellets in the frying step.

DETAILED DESCRIPTION OF THE INVENTION

The starting material for the present process contains rendered animal particles which, in total combination, have high collagen contents. These particles may be obtained from various animal parts some of which at least are high in collagen, including connective tissue, cartilage (such as derived from snouts, ears, hooves, etc.), intestinal tract tissue and skin. Other parts may be low in collagen and it is only necessary that the total mixture of animal parts have a relatively high average collagen content. the absolute collagen content may vary considerably, depending on the specific source of the animal part. The absolute content is not critical so long as the content is sufficiently high to cause "gelatinization" of the extruded animal parts, as explained hereinafter more fully.

Traditional "pork skins" are taken from pork bellies and backs, but, with the present process, any animal skin may be used, either bovine or non-bovine. Indeed, the starting material may contain fowl skin, e.g., chickens and turkeys, or beef skin or skin from parts of pigs other than the bellies and backs, e.g. the head skin, leg skin, and the like. Of course, only traditional pork belly skin (either green skins, rendered skins, bacon and ham rinds) may be used in the process. The proportion, if any, of pork belly or back skin may vary depending upon the collagen contents, availability and cost thereof, but the product of the invention may have only a minor amount of pork belly or back skin, i.e., the animal parts (starting material) may contain less than 50% by weight of pork belly or back skin, especially less than 25%, or essentially no pork belly or back skin, although, if desired, the process may be carried out with all or essentially all pork belly or back skin.

The ability of the present process to provide a puffed snack food from a variety of animal parts is a distinct advantage in the art and constitutes an important feature of the invention. However, when utilizing such diverse starting material, the present process must depart from conventional processes.

In the first departure, since all of the animal parts used as the starting material may not have been rendered, and since it has been found that the presence of rendered parts is necessary, the starting material should be comprised of at least 50% by weight of rendered animal parts. More often 60% or 75% of rendered parts will be used. Of course, when the fines, balls and tails are used, exclusively as the starting material, then 100% of the starting material is rendered and this is one of the preferred forms of the invention.

The moisture content of the particles must be adjusted in order to accomplish the required gelatinization in the extruding step. If the moisture content is less than about 18% by weight, the risk of insufficient gelatinization during the extruding step significantly increases. If sufficient gelatinization is not accomplished, then the extrudate will not be shape-sustaining and often the product will not puff uniformly in the frying step and hard centers will occur. Optimum moisture contents are about 21 to 22%, although good results can be obtained with moisture contents between 20 and 25% by weight. On the other hand, the moisturizing step should not result in too much moisture in the particles. Moisture contents above 30 or 35% by weight significantly increase the risk of undue steaming and the extrudate may not be shape-sustaining.

The moisturizing step may be accomplished in any desired manner, e.g., the animal parts may be lagged in a high humidity atmosphere or steamed or sprayed with water. Of course, in some combinations of animal parts and rendered parts the total combination will have moisture contents within the present ranges and no positive moisturizing step with water is required.

As can be appreciated, the moisturizing step may be carried out on the animal parts, as received, but the step will be hastened if the animal parts have been comminuted into small particles. This provides greater surface area for more rapid moisturization. Thus, while the moisturizing step may be carried out prior to a comminuting step, if required to obtain the correct particle size, it is preferred that the reverse of these steps be carried out, i.e., the comminuting step to the smaller particle sizes, followed by the moisturizing step, since this hastens the moisturizing step.

In the foregoing regard, both to increase the rate of moisturization and for purposes of effective gelatinization during the extruding step, the particles should have an average dimension no greater than ½ inch and, preferably, no greater than ¼ to ⅛ inch. Optimally, the average dimension of the particles will be between about 1/16th and ⅛ inch. Some sources of starting material may have particle sizes inherently within this range. For example, some of the smaller pieces of the balls and tails and, of course, the fines will be within or less than the above-noted particle-size ranges. These rendered wastes are quite acceptable as a starting material for the present process and, hence, this starting material may require no comminuting step. On the other hand, where skin (such as chicken skin) is used as the starting material, a comminuting step to provide the correct particle size will be required.

The moisturizing step may also be hastened by moisturizing at elevated temperatures. Generally speaking, temperatures of the animal parts of up to about 200° F. are acceptable. There is no minimum temperature so long as freezing temperatures are avoided.

The extruder used in the present invention is any conventional die-ended screw-type, food-grade extruder. The only requirement is that the barrel sections and usually the die must be thermally controllable. There may be one or more means of controlling temperature, e.g., electrical heaters, oil heaters, steam heaters, water coolers, etc.

It has been found that the heat normally transmitted from the extruder barrel to the feed throat will be sufficient to cause some liquefication of the fat in the starting material particles and that the lubricity so generated interferes with the proper operation of feed flights of the extruder screw. Thus, proper pressure and mechanical action are not generated in the extruder and, consequently, the required gelatinization does not take place. Accordingly, it has been found that the extruder throat to which the particles are fed must be relatively cool and, correspondingly, any hopper above that throat must also be cool. To insure good gelatinization, the hopper and throat section of the barrel should be maintained at a temperature of less than 85° F., especially less than 80° F., e.g., between 60° F. and 75° F. Otherwise, such liquefication of fat may take place that the undesired lubricity occurs. Of course, the particles themselves may be cooled for the reasons noted above and temperatures less than 85° F. should also be used.

With the cooled extruder throat, the feed flights of the extruder screw can generate sufficient feed pressure on the particles that the working and compression flights of the screw can generate sufficient mechanical energy to cause the moisturized material to compact, and, at least, partially gelatinize during passage through the extruder barrel. To accomplish this gelatinization within reasonable lengths of an extruder barrel, that section of the barrel between the throat section and the die section is heated to a temperature of at least 215° F. and up to 310° F., e.g., 250°–300° F. This will insure vaporization of some of the water associated with the material and will provide sufficient temperature to insure substantial gelatinization. On the other hand, at temperatures above 300°–310° F., the gelatinization tends to become excessive and, indeed, with prolonged heating at these higher temperatures, denaturization of the protein could result. This would prevent subsequent puffing of the extrudate.

Proper gelatinization can be insured by visually observing the extrudate as it exits the die. The extrudate must have a smooth and glossy appearance, i.e. does not show discrete particles, and at room temperature the extrudate should not exhibit any revision characteristics. Reversion is herein defined as the extrudate losing the smooth and glossy appearance and reverting to an agglomeration of particulate material. This indicates that sufficient gelatinization has not been accomplished and that subsequent attempts to cut and fry this material will simply result in disruption of the shape and insufficient puffing. By controlling the rotation of the screw, and, hence, the amount of input of mechanical energy, as well as the corresponding feed of the moisturized particles, the extrudate which exits from the die has the smooth and glossy characteristics and will not exhibit reversion characteristics at room temperature, e.g., 75° F. In absolute values, it is preferred that at least 10%, to 75% of the collagen in the particles be gelatinized, although at least 25% or 50% will insure superior puffing properties.

As the extrudate exits the die, it will undesirably pop or sputter if the extrudate is too hot. As can be appreciated, the hot moisturized and gelatinized extrudate, being suddenly reduced from extruder/die pressures to atmospheric pressure, can cause flashing of moisture. While the moisture is somewhat tied-up in the extrudate, the extrudate should be cooled to less than 220° F. prior to exiting the die. This cooling is accomplished by cooling the barrel section next to the die or the die, or both, to temperatures sufficiently to insure that the extrudate exits the die at temperatures of 220° F. or less. For example with an unheated die, cooling the barrel section with 80° F. or less water will usually be sufficient to accomplish this cooling of the extrudate.

The extrudate is further cooled, preferably to less than 160° F., and, more preferably, to about 150° F. to 120° F., or less. This cooling of the gelatinized extrudate insures that the extrudate may be cut to correctly-sized pellets without tearing or disrupting the extrudate. The pellets, on an average, should have a dimension no greater than about ¼ inch, or, otherwise, the subsequent deep-fat frying step may not uniformly cook the pellets and provide uniform puffing. Additionally, if a dimension no greater than ⅛ inch is not provided, the subsequent drying step may be inordinately long. Other dimensions, of course, can be as desired. The cutting may be accomplished by any conventional means such as slicing knives, rotating knives, discs and the like.

It is also desirable to pull the extrudate as it passes from the extruder die prior to cutting. The pulling tends to reduce any unevenness of the thickness of the strips and provide a more uniform cross-section for more predictable puffing. This pulling to elongate 25% to 200% (1.25 to 3.00X) can be done by hand or by lightly pressured pinch rolls. When pinch rolls are used they may be enclosed in a housing to more effectively perform the cooling, discussed above, by cooled and/or dry air. If sufficient time is provided in such a housing a "case hardening" can result and will avoid the agglomeration, discussed below.

The cut strips (pellets) will have moisture contents too high for effective deep-fat frying. The pellets must be dried to a moisture content of at least less than 15% by weight, prior to frying. These moist pellets have a tendency to agglomerate. Provisions should be made for preventing this agglomeration, e.g. by tumbling or agitation or tray ovens and the like can be used for drying, but, in any case, temperatures of less than 220° F. should be used to avoid undesired pre-cooking.

In any drying procedure, the normal transmission of moisture through the pellets will result in the inner portions of the pellets having a higher moisture content than the outer portions of the pellets. A non-uniformity of moisture within the pellets can result in non-uniform puffing during the frying step. To avoid this possibility, it is usually necessary to equilibrate the pellets prior to the frying step. Equilibration means that the pellets are allowed to lag or rest for a time sufficient that the moisture content of the pellets becomes relatively uniformly distributed throughout the pellets. This time period can vary, depending upon the particular pellets and the moisture content, as well as the conditions of equilibration, but, generally, from 1 to 15 hours will be required, more usually between 4 and 12 hours. Further, the time required can be shortened by carrying out the equilibration step at elevated temperatures, which increases moisture migration within the pellets. Temperatures up to 150° F. to 175° F. are satisfactory. Also, if elevated temperatures are used, the pellets may be equilibrated by tumbling or other such agitation.

The pellets are then ready for frying in hot fat at 350° F. to 420° F. ("fat" is defined to include all edible animal and vegetable fats and oil that are liquid at the foregoing temperatures). Below 350° F., the frying time is excessive and uniform puffing may not result, while above 420° F., the puffing can be so rapid that non-uniform puffing may occur. More preferably, the temperature of the deep-fat frying will be between about 365° F., and 400° F., with an optimum temperature of about 385° F. With this temperature, the frying step may be accomplished in as little as about 15 seconds, although frying time up to 3 minutes or more may be used. Generally speaking, however, 30 seconds to 1½ minutes will be sufficient frying time with an optimum result at about 45 seconds. In any event, the frying step should reduce the moisture content of the puffed pellets to at least less than 3.5% by weight, especially 3 or 2.5% or less. Otherwise, the brittle and "crackling" characteristic may not be obtained. The frying step should also puff the pellets to at least double the volume of the unfried pellets and, more preferably, at least triple the volume of the unfried pellets. This will insure the light and friable characteristic associated with deep-fat fried pork skins.

By the addition of a proper coloring agent, either prior to, during or after the frying step, the fried pellets will have the color and texture of a puffed pork skin. With the addition of salt, i.e., up to 3% by weight, the correct flavor will be obtained. Thus, total overall appearance, mouth feel and taste will be very similar to conventionally deep-fat fried pork skins, and the product may be accurately characterized as a reconstituted fried and puffed pork skin.

Additional flavoring agents may be used, if desired. The flavoring agents may be added at any step, but a well-received flavor is produced when the moisturized particles are heated with hot smoke, either during or after the moisturizing step, or smoked salt is used in lieu of natural salt (with or without pepper to taste being added). In the former embodiment, when the particles are moisturized in liquid water, then the hot-smoke treatment will be thereafter and any drying during the hot-smoke treatment should be compensated by additional moisturizing during the moisturizing step. Hot smoke at about 200° F. is acceptable in this regard.

Alternatively, flavoring agents may be added during the extruding step. This is particularly effective when the flavoring agent is added so that the flavoring agent is worked into the material during gelatinization thereof. A suitable extruder for carrying out this embodiment of the invention is disclosed in U.S. Pat. No. 2,915,957, which disclosure is incorporated herein by reference.

It should be appreciated, however, that during the extrusion step, fat may be expelled and this fat may be eliminated from the extruder barrel by way of a conveniently-placed tap. Otherwise, the fat could interfere with proper flavoring of the gelatinized material. The use of a tap for removing excess fat is disclosed in U.S. Pat. No. 3,793,467, which disclosure is incorporated herein by reference. This reference also provides further details of useful extruders for extruding animal parts, particularly pork rinds.

The product which results from the process may be characterized as a reconstituted fried and puffed pork skin. The product comprises fat-fried, shape-sustaining pellets of at least partially-gelatinized particles of animal parts which have high collagen contents. The moisture contents of the fried pellets are 3% by weight or less and the puffed volume of the pellets is at least doubled the unfried volume of the pellets. Preferably, the animal parts have had a collagen content of at least 25% by weight, e.g., 30% to 45% based on the tissue weight of the animal parts, since this insures quality fried products.

As noted above, the product may be colored with food grade colors, and flavored with food grade flavors. Additionally, the product may contain preservatives such as BHT, BHA and the like.

The invention will be illustrated by the following examples, where all parts and percentages are by weight, unless otherwise designated. However, the invention is not limited to the specific examples thereof but is fully applicable to the scope of the foregoing disclosure.

EXAMPLE 1

In this example, the starting material is an equal weight combination of fines, balls and tails from a conventional rendering of pork skins. The moisture content and fat content have been reduced to the usual rendered levels. The materials are ground in an Urschel Comitrol to an average dimension of the particles of between about 1/16th and ⅛th inch. The particles are treated with water heated to temperatures between 150° F. and 180° F. The mixture is periodically checked and, after about ½ hour, the moisture content of the particles is between about 21% and 22%.

The moisturized particles are fed to a hopper mounted above the throat of a die-ended screw-type extruder. The barrel section of the extruder closest to the throat is maintained at a temperature of about 70° F. by passage of chilled water through that barrel section. This cooling of the throat section also maintains the hopper at a temperature of about 75° F. The last section of the barrel of the extruder, the section before the die, is cooled with water at a temperature of about 70° F. by passage of chilled water through that barrel section. The sections of the barrel between the throat section and the die section are maintained at about 270° F. by passage of live steam therethrough. The die slit width is about 0.040 inch on each end and about 0.025 in. in the center of a gentle curved shape.

With the screw turning, the moisturized particles are fed into the hopper and throat (mechanical or pressurized feeding may be used, if desired). The feed rate of the moisturized material and the rpm's of the screw are adjusted (after initial start-up period) so that the extrudate exits the die and has a smooth, glossy appearance which indicates that sufficient gelatinization has taken place during the extruding step.

The extrudate is pulled out to above twice the extruded length, cooled to room temperature and cut into pellets which are about ⅛ inch thick, about ¾ to 1 inch wide, and about 1½ inches long. The pellets are dried at room temperature until moisture contents of about 10% to 12% are reached, which drying time also provides for equilibration of the moisture within the pellets.

The pellets are carefully dumped into a deep-fat frying vat where the fat is maintained at about 385° F. In approximately 45 to 70 seconds, the pellets are puffed to about twice the unfried volume and the moisture content is reduced to about 2.5% by weight.

The puffed pellets are tender, brittle, shape-sustaining and handleable. The puffed pellets have good mouth feel and are relatively easily chewed. The deep-fat fried pork skin flavor is immediately apparent in the mouth.

EXAMPLE 2

The procedure of Example 1 is repeated, with the exception that 50% by weight of the starting material is replaced with chicken skin and connective tissue. A portion of the product is tumbled with 2% by weight of salt to add flavor thereto. Another portion of the product is tumbled with smoke-flavored salt for the same purpose.

EXAMPLE 3

The procedure of Example 1 is repeated, with the exception that the starting material is 50% of various animal parts from beef slaughtering, including connective tissue, digestive tissue, cartilage, and skin.

A portion of the product is tumbled with 2% salt to add flavor thereto.

What is claimed is:

1. A method for producing a fried and puffed product from animal parts comprising:
   (1) providing a starting material which comprises particles of animal parts which are sufficiently high in collagen content to cause gelatinization of the animal parts and at least 50% by weight thereof are rendered parts;
   (2) moisturizing the particles to moisture contents between 18% and 35% by weight;
   (3) feeding the moisturized particles to the throat to a die-ended screw-type extruder having thermally-controllable barrel sections along the length of screw;
   (4) maintaining the barrel section next to the throat at temperatures of less than 85° F., maintaining the extruder barrel between the throat section and a section next to the die at a temperature of at least 215° F. to partially gelatinize but not to substantially denature said animal parts and maintaining the barrel section next to the die and the die at temperatures such that the extrudate exiting the die is at temperatures no greater than 220° F.;
   (5) rotating the screw of the extruder and controlling the rate of feed of the moisturized particles to the throat so that a smooth, glossy extruder exits from the die and the extrudate will not revert to an agglomeration of particulate material at room temperature;
   (6) cooling the extrudate to temperatures of less than 160° F.;
   (7) cutting the extrudate to pellets so that one dimension thereof is no greater than ⅛th inch;
   (8) drying the pellets to moisture contents of less than 15% by weight; and
   (9) frying the pellets in fat at temperatures between 350° F. and 420° F. until the moisture content of the pellets is less than 3.5% by weight and the pellets have puffed to at least twice the unpuffed volume.

2. The method of claim 1 wherein the animal parts are comminuted to have an average dimension of no greater than ½ inch.

3. The method of claim 1 wherein the moisturizing step is carried out at temperatures up to 200° F.

4. The method of claim 1 wherein the drying of the pellets is at least carried out by air-drying at temperatures up to 220° F.

5. The method of claim 1 wherein the dried pellet are equilibrated until the moisture distribution is essentially uniform throughout the pellets.

6. The method of claim 1 wherein the frying puffs the pellets to at least triple the volume of the unfried strips.

7. The method of claim 1 wherein the collagen content of the starting material is at least 25% by weight.

8. The method of claim 1 wherein the starting material contains one or more of fowl skin, beef skin, pork head skin, pork back skin, pork leg skin and pork belly skin.

9. The method of claim 1 wherein at least 75% of the starting material has been rendered.

10. The method of claim 1 wherein 100% of the starting material has been rendered.

11. The method of claim 1 wherein the moisture content of the moisturized particles is between 20% and 25%.

12. The method of claim 1 wherein the extruder barrel between the throat section and the section next to the die is maintained at temperatures between 215° and 310° F.

13. The method of claim 1 wherein at least 10% of the collagen in the particles is gelatinized in the extruding step.

14. The method of claim 1 wherein the extrudate is pulled as it passes from the extruder die to elongate the extrudate at least 25%.

* * * * *